(12) United States Patent
Chebbi et al.

(10) Patent No.: US 12,579,060 B2
(45) Date of Patent: Mar. 17, 2026

(54) DYNAMIC RANDOM-ACCESS MEMORY (DRAM) EFFICIENCY CALCULATION AND UTILIZATION OF LAST LEVEL CACHE (LLC)

(71) Applicant: QUALCOMM Incorporated, San Diego, CA (US)

(72) Inventors: Shriharsha Chebbi, Hyderabad (IN); Nirav Narendra Desai, Hyderabad (IN); Badrinath Dorairajan, Bangalore (IN); Lakshmi Narayana Panuku, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/475,492

(22) Filed: Sep. 27, 2023

(65) Prior Publication Data

US 2025/0103479 A1 Mar. 27, 2025

(51) Int. Cl.
*G06F 12/02* (2006.01)
*G06F 12/0891* (2016.01)

(52) U.S. Cl.
CPC ........ *G06F 12/023* (2013.01); *G06F 12/0891* (2013.01)

(58) Field of Classification Search
CPC ........................... G06F 12/023; G06F 12/0891
USPC ......................................................... 711/105
See application file for complete search history.

(56) References Cited

U.S. PATENT DOCUMENTS

| | | | | |
|---|---|---|---|---|
| 10,776,270 B2 * | 9/2020 | Gaur | ................... | G06F 12/0888 |
| 2012/0210055 A1 * | 8/2012 | Mace | ................... | G06F 13/1626 |
| | | | | 711/E12.001 |

| | | | | |
|---|---|---|---|---|
| 2016/0321187 A1 * | 11/2016 | Bernat | ................ | G06F 12/1018 |
| 2017/0169902 A1 * | 6/2017 | Chun | .................. | G06F 11/1048 |
| 2017/0277460 A1 * | 9/2017 | Li | ........................... | G06F 1/3275 |
| 2017/0345482 A1 * | 11/2017 | Balakrishnan | ........ | G06F 3/0634 |
| 2018/0267595 A1 * | 9/2018 | Nampoothiri | ......... | G06F 1/3225 |
| 2018/0335828 A1 * | 11/2018 | Chun | .................... | G06F 1/3234 |

(Continued)

OTHER PUBLICATIONS

International Search Report and Written Opinion—PCT/US2024/040506—ISA/EPO—Nov. 15, 2024.

*Primary Examiner* — Jared I Rutz
*Assistant Examiner* — Wei Ma
(74) *Attorney, Agent, or Firm* — Muncy, Geissler, Olds & Lowe, O.C.

(57) ABSTRACT

Various embodiments include systems and methods for improving Dynamic Random-Access Memory (DRAM) efficiency and Last Level Cache (LLC) utilization. A computing system may be configured to dynamically adjust DRAM efficiency calculations based on multiple system metrics and conditions (e.g., DDR frequency, density, refresh rates, etc.) for more accurate frequency settings and improved power consumption. The computing system may use a multi-stage approach that includes memory and cache allocation, bandwidth management, and frequency settings. The computing system may fine-tune the DRAM efficiency calculations based on various other factors (e.g., cache miss rates, power consumption, etc.), dynamically modify operational parameters (e.g., DDR frequencies, etc.) in response to specific events or computational tasks, and work in tandem with other system components (e.g., a Last-Level Cache Controller (LLCC), etc.) to improve resource allocation.

24 Claims, 10 Drawing Sheets

(56)                          References Cited

U.S. PATENT DOCUMENTS

2018/0373314 A1\*  12/2018  Stewart ................. G06F 1/3296
2020/0210332 A1\*   7/2020  Steiner ................ G06F 11/3495
2022/0254409 A1\*   8/2022  Desai .................. G06F 12/0607

\* cited by examiner

From Block 304
In FIG. 3A

332 — Generate And Store A DRAM Efficiency Calculation Database In Which Efficiency Is Mapped As The Function Of DDR BW, DDR Density, And DRAM Refresh Rate 336 — Determine The DRAM Efficiency Value Based On The Information Stored In The Generated Database 338 — Determine The DDR Frequency Value Based On The DRAM Efficiency Value To Block 306 In

350

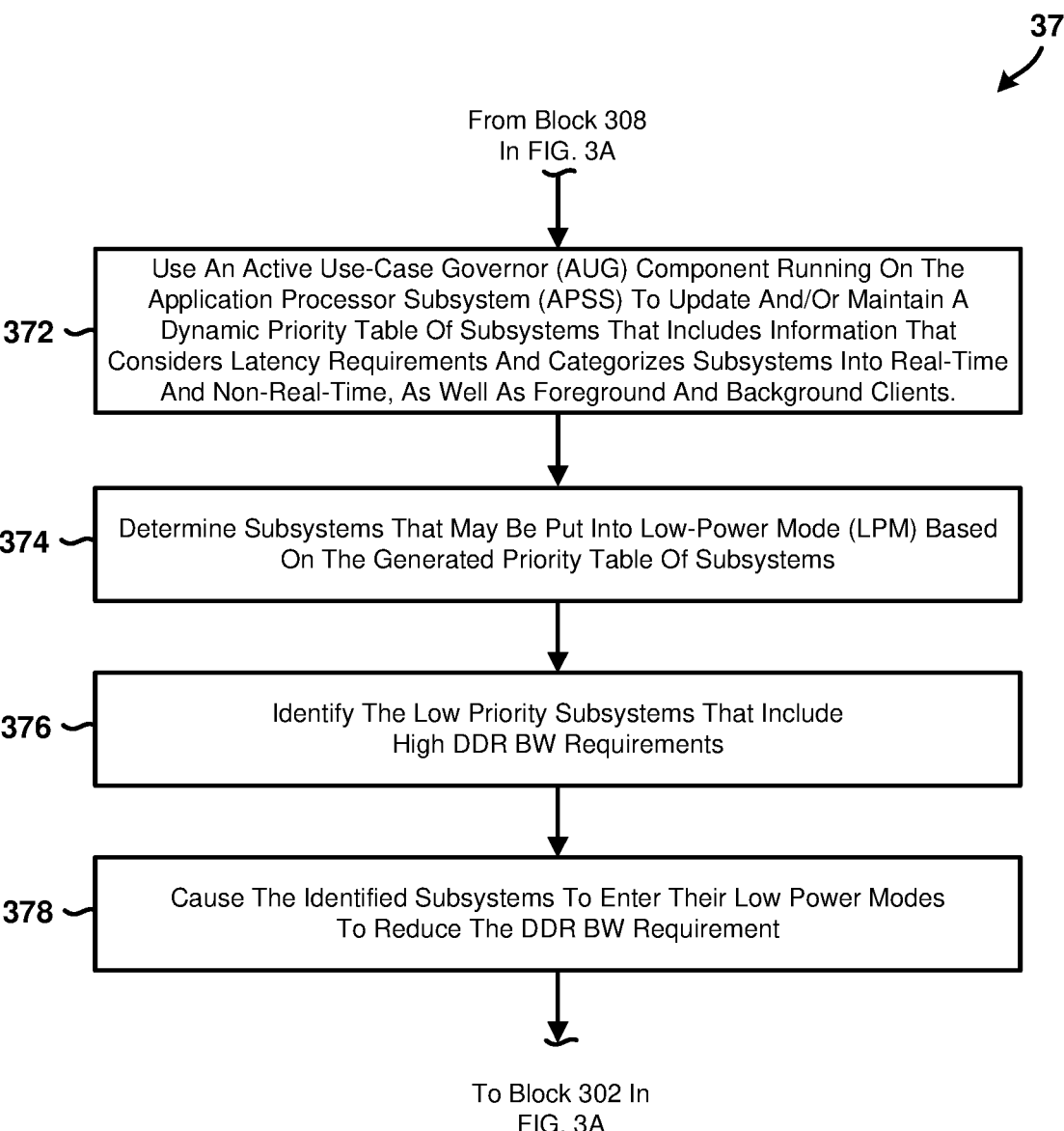

_370_

From Block 308
In FIG. 3A

372 — Use An Active Use-Case Governor (AUG) Component Running On The Application Processor Subsystem (APSS) To Update And/Or Maintain A Dynamic Priority Table Of Subsystems That Includes Information That Considers Latency Requirements And Categorizes Subsystems Into Real-Time And Non-Real-Time, As Well As Foreground And Background Clients.

374 — Determine Subsystems That May Be Put Into Low-Power Mode (LPM) Based On The Generated Priority Table Of Subsystems

376 — Identify The Low Priority Subsystems That Include High DDR BW Requirements

378 — Cause The Identified Subsystems To Enter Their Low Power Modes To Reduce The DDR BW Requirement To Block 302 In
FIG. 3A

FIG. 3E

DYNAMIC RANDOM-ACCESS MEMORY (DRAM) EFFICIENCY CALCULATION AND UTILIZATION OF LAST LEVEL CACHE (LLC)

BACKGROUND

Recent advances in power management and memory technologies have greatly improved the performance and efficiency of modern computing devices. These technologies balance tradeoffs between computational power and energy consumption to improve performance while minimizing the strain on device resources. As such, these technologies may be particularly important in systems and environments in which energy efficiency is a considerable concern, such as in mobile devices.

Dynamic Random-Access Memory (DRAM) is a popular memory technology used in modern computing systems. DRAM often interfaces through Double Data Rate (DDR) channels. DDR memory has evolved through several generations, each offering higher bandwidth and lower power consumption than its predecessor. The DRAM and DDR memory systems work in tandem with other power management and memory technologies to increase throughput and reduce energy use.

Dynamic Clock and Voltage Scaling (DCVS) is an important power management technology that dynamically adjusts the frequency and voltage of one or more processors based on workload and other variables. By doing so, DCVS may improve energy consumption and heat dissipation characteristics of the computing device without having a substantial negative impact on the computational performance of the computing device. For example, the DCVS may decrease the clock speed and lower the voltage to improve the power consumption characteristics of the device in response to determining that an application processor (AP) in the device is currently underutilized.

Partial Array Self Refresh (PASR) is another important power management technology that selectively deactivates certain portions of the DRAM when they are not in use to reduce power consumption. As such, PASR is particularly useful in systems and environments in which energy efficiency is a considerable concern, such as in mobile devices.

SUMMARY

Various aspects include methods of improving memory bandwidth in a computing device. In some aspects, the methods may include determining whether a new double data rate (DDR) bandwidth (BW) requirement has been received for a DDR dynamic random-access memory (DRAM) in the computing device, determining whether there are changes in a DDR refresh rate or a DDR density of the DDR DRAM, determining whether the DDR DRAM may be operating at an upper frequency of operation, and determining a DRAM efficiency value based on at least one or more of whether the new DDR BW requirement has been received, whether there are changes in the DDR refresh rate or the DDR density, or whether the DDR DRAM may be operating at the upper frequency of operation. Some aspects may further include using the determined DRAM efficiency value to perform dynamic clock and voltage scaling (DCVS) operations that scale a clock frequency, a DDR frequency, or a supply voltage in the computing device.

Some aspects may further include determining an availability of unused last level cache (LLC) lines in response to determining that a new DDR BW requirement has been received, dynamically assigning the unused LLC lines to high DDR BW demand clients, and sending feedback to the high DDR BW demand clients to update BW requirements. In some aspects, determining whether there are changes in the DDR refresh rate or the DDR density of the DDR DRAM may include determining whether there are changes in the DDR refresh rate or the DDR density of the DDR DRAM in response to determining that a new DDR BW requirement has not been received. Some aspects may further include generating a datastore that maps DRAM efficiency as a function of DDR BW, DDR density, and DRAM refresh rate, determining the DRAM efficiency value based information included in the generated datastore, and determining a DDR frequency value based on the determined DRAM efficiency value.

In some aspects, determining whether the DDR memory may be operating at the upper frequency of operation may be performed in response to determining that there are no changes in the DDR refresh rate or the DDR density of the DDR memory. Some aspects may further include flushing an underutilized last level cache (LLC) line in response to determining that a client assigned the LLC line may be not using the assigned LLC line effectively, assigning the newly flushed LLC line to a high DDR BW demand client, and sending feedback to the high DDR BW demand client to update BW requirements. Some aspects may further include determining whether further adjustments to the DRAM efficiency value or assigned LLC line would better balance tradeoffs between performance and power consumption in the computing device. Some aspects may further include in response to determining that further adjustments to the DRAM efficiency value or the assigned LLC line would better balance tradeoffs between performance and power consumption in the computing device determining subsystems of the computing device that may be put into a low-power mode (LPM) based on information stored in a priority table, traversing the determined subsystems to identify a low priority subsystem that may include a high DDR BW requirement, and causing the identified low priority subsystem to enter the LPM.

Further aspects may include a computing device having a processing system configured with processor-executable instructions to perform various operations corresponding to the methods summarized above. Further aspects may include a non-transitory processor-readable storage medium having stored thereon processor-executable instructions configured to cause a processing system to perform various operations corresponding to the method operations summarized above. Further aspects may include a computing device having various means for performing functions corresponding to the method operations summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIGS. 3A-3E are process flow diagrams illustrating methods of improving the performance and battery consumption characteristics of a computing system by improving the usage of dynamic random-access memory (DRAM) and last level cache (LLC) in the computing system in accordance with some embodiments.

DETAILED DESCRIPTION

Figure 1:
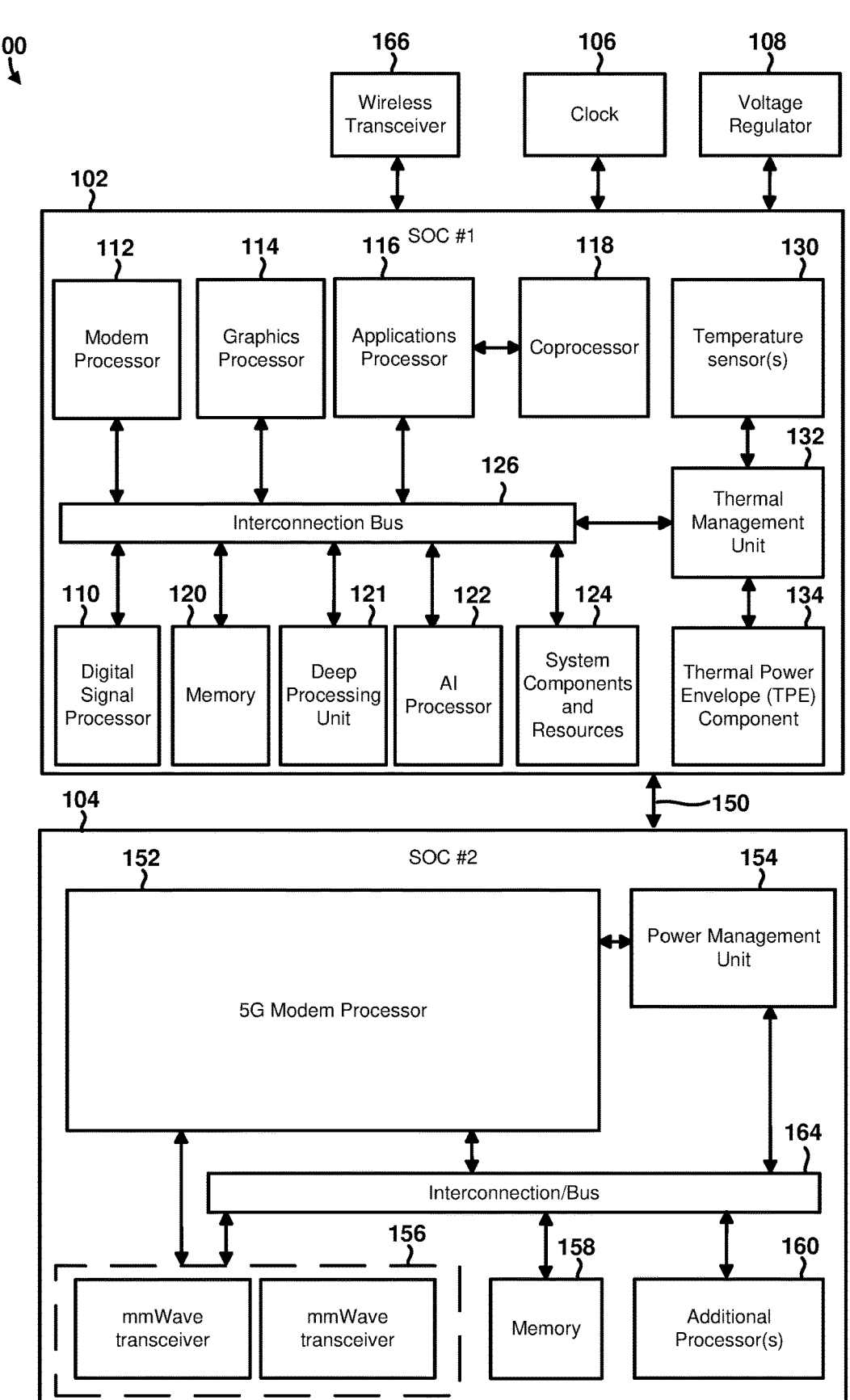
FIG. 1 is a component block diagram illustrating example components in system in package (SIP) that may be included in a computing device and configured to implement some embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods of improving memory bandwidth in computing devices by determining a double data rate (DDR) dynamic random-access memory (DRAM) efficiency value based on at least one or more of whether a new DDR bandwidth requirement has been received, whether there are changes in the DDR refresh rate or the DDR density, or whether the DDR DRAM is operating at an upper frequency of operation, and using the DRAM efficiency value to perform dynamic clock and voltage scaling (DCVS) operations.

The term "computing device" may be used herein to refer to any one or all of personal computers, laptop computers, tablet computers, user equipment (UE), smartphones, personal or mobile multi-media players, personal data assistants (PDAs), palm-top computers, wireless electronic mail receivers, multimedia Internet enabled cellular telephones, gaming systems (e.g., PlayStation™, Xbox™, Nintendo Switch™, etc.), wearable devices (e.g., earbuds, smartwatch, head-mounted display, fitness tracker, etc.), media players (e.g., DVD players, ROKU™, AppleTV™, etc.), digital video recorders (DVRs), automotive displays, portable projectors, 3D holographic displays, and other similar devices that include a display and a programmable processing system that can be configured to provide the functionality of various embodiments.

The term "processing system" is used herein to refer to one more processors, including multi-core processors, that are organized and configured to perform various computing functions. Various embodiment methods may be implemented in one or more of multiple processors within a processing system as described herein.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC may include a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. An SoC processing system also may include software for controlling integrated resources and processors, as well as for controlling peripheral devices.

The term "system in a package" (SIP) may be used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard, in a single UE, or in a single CPU device. The proximity of the SoCs facilitates high-speed communications and the sharing of memory and resources.

Dynamic Clock and Voltage Scaling (DCVS) is a power management technique used in modern computing devices (e.g., smartphones, tablets, etc.) to improve the devices' performance, energy consumption, and/or thermal performance characteristics. DCVS systems may dynamically scale the clock frequency, DDR frequency, and supply voltage based on workload requirements to balance tradeoffs between performance and energy consumption. In low workload conditions, the DCVS system may reduce the clock frequency and voltage to conserve energy. The DCVS system may increase these parameters during high-demand tasks to improve performance. Some embodiments may include a computing system equipped with a DCVS system that is configured to further improve a computing device's performance and energy consumption characteristics by performing scaling operations that account for a variable/dynamic DRAM efficiency value.

Dynamic Last Level Cache (LLC) is an adaptable real-time management feature that may be integrated into the final cache level of a computer's memory hierarchy. Unlike static cache configurations with predetermined sizes and policies, dynamic LLC systems may dynamically adjust parameters such as size, associativity, and power states based on current workload demands. This dynamic nature may improve the computing device's performance, efficiency, and power consumption characteristics. For example, the dynamic LLC may improve a processor's data access speed by allocating more cache space or adjusting its policies to minimize cache misses when a high-performance task is executed. During periods of lower demand, the dynamic LLC may scale down its size or enter a low-power state to conserve energy.

Partial Array Self Refresh (PASR) is a power-saving technology of Dynamic Random-Access Memory (DRAM) systems included in modern computing devices (e.g., smartphones, tablets, servers, etc.). PASR may selectively refresh only those portions of the memory array that are in active use while allowing other, unused sections to enter a low-power state. This selective approach contrasts with traditional full-array refresh solutions that refresh the entire DRAM array irrespective of whether all segments are in use (and thus consume more energy). By reducing the number of refresh cycles for portions of the memory that are not currently being accessed, PASR may effectively lower overall power consumption on the device, contributing to longer battery life in mobile devices and reduced energy costs in data centers.

Dynamic Random-Access Memory (DRAM) is a volatile memory commonly used in modern computing devices (e.g., smartphones, tablets, etc.) to temporarily store data and instructions that are currently in use or "in processing." In recent years, DRAM has grown in popularity and use because it allows for quick read and write access for the central processing unit (CPU) with a relatively lower cost and a higher density than other types of memory such as Static Random-Access Memory (SRAM). The integration of DRAM in such systems may improve the overall performance by allowing for smooth multitasking, rapid application loading, and efficient execution of complex tasks. As the demand for enhanced functionality and user experience in mobile devices continues to grow, DRAM remains a widely used component that meets these evolving demands.

Double Data Rate (DDR) memory is a specialized type of DRAM that is configured to improve data transfer rates by performing operations on both the rising and falling edges of the clock signal, thereby doubling the data transfer rate. In modern mobile devices such as smartphones and tablets, DDR memory often serves as the main system memory, allowing for quicker and more efficient handling of tasks. With the increasing demand for devices capable of running complex applications, streaming high-definition content, and supporting multi-tasking operations, DDR memory has become a widely adopted solution that meets the ever-increasing demands for enhanced functionality and provides a smoother user experience and more responsive device operations.

DDR channels are pathways between a memory controller and a DDR memory module that allow for data transfers. DDR systems may have one or more channels (e.g., single-channel, dual-channel, or multi-channel configurations). The number of channels may be based on memory bandwidth requirements and/or the "memory configuration" or architecture of the memory controller.

Memory configurations may play a substantial role in determining the overall performance and efficiency of modern computing devices. Multi-channel memory configurations (e.g., dual-channel, quad-channel, etc.) generally include multiple data pathways or "channels" between the memory modules and the memory controller, which may increase the data transfer rate by enabling simultaneous read or write operations across multiple channels. A "single-channel DDR configuration" is a memory configuration with a single data pathway (DDR channel) between the memory controller and the DDR memory modules. Single-channel DDR configurations do not have as much bandwidth as their multi-channel counterparts but are generally much more cost-effective. Single-channel DDR configurations often allow a computing device to perform tasks sufficiently well for most users while maintaining a reasonable battery life and cost structure. As such, single-channel DDR configurations are commonly used in modern computing devices to balance performance and resource utilization of computing devices and comply with other design requirements such as cost, power consumption characteristics, form factor, etc.

DRAM efficiency is an important characteristic of modern computing devices that may be used to determine how well a DDR memory system performs under real-world operational conditions (as opposed to merely considering its theoretical specification). Accurately determining the DRAM efficiency value may allow the computing system to better calibrate the memory's operating speed (e.g., as part of the DCVS operations, etc.). For example, a high DRAM efficiency at a given DDR frequency may indicate that the system adequately uses its resources at that frequency level and is well suited for high-performance tasks. On the other hand, a low DRAM efficiency at higher DDR frequencies may suggest that increasing the DDR frequency further may not yield a proportional increase in performance and may even have a negative impact on the power consumption characteristics of the device.

The DRAM efficiency value may be used to determine the effective DDR frequency, which may in turn be used by a DCVS system to balance various tradeoffs between the performance and energy consumption characteristics of the device. A computing system may be configured to determine DRAM efficiency as the ratio of the actual bandwidth realized by the DRAM to the theoretical peak bandwidth achievable. Mathematically, this DRAM efficiency ratio may be expressed as: DRAM efficiency=Actual DRAM Bandwidth realized/Theoretical peak DRAM Bandwidth achievable. Due to several factors, this DRAM efficiency is nearly always less than 100% for any given target configuration. For example, if a System on Chip (SoC) demands a DDR frequency of 1555 MHz and the DRAM is utilized at 100%, a computing system could determine that the DDR bandwidth would reach 6220 MB per second with a 1*16 DDR configuration. Yet, such a determination may be inaccurate because, in real-world operational environments, the actual bandwidth often deviates from this theoretical maximum due to various dynamic variables and factors (e.g., operating temperature, DDR density, etc.).

Thus, DRAM efficiency may be used to determine the effective DDR frequency, is influenced by many factors, and remains less than 100%. Examples of the factors that could impact DRAM efficiency include DRAM losses, operational overheads, DDR density, DRAM refresh rates, DDR frequencies, and temperature conditions. For example, a rise in DDR density may decrease DRAM efficiency across different frequencies. Temperature conditions may directly affect DRAM refresh rates, which may also significantly impact the DRAM efficiency value. DRAM losses may be a factor related to issues such as signal degradation or electrical inefficiencies within the memory modules, which could significantly impact the DRAM efficiency value. Operational overheads may be a factor related to tasks that the memory performs that are unrelated to reading or writing data, such as opening and closing memory pages (which organize the data) or executing refresh cycles to maintain the integrity of the stored information, which may also significantly impact the DRAM efficiency value.

Conventional solutions do not adequately account for the DRAM efficiency value being a dynamic value that fluctuates with changing DDR frequencies, densities, refresh rates, temperatures, DDR densities, DRAM losses, operational overheads, etc. Rather, most conventional solutions simply assume that the DRAM efficiency value is static. This oversimplification may result in inaccurate frequency settings and inefficient power utilization because DRAM efficiency varies across different DDR frequencies, densities, and refresh rates.

Some conventional solutions may determine DDR frequency by aggregating two key metrics: Aggregated Bandwidth (AB) and Instantaneous Bandwidth (IB). These solutions may determine the DDR frequency value by using the aggregated votes to query a look-up table that maps bandwidth requirements and a static DRAM efficiency value to the DDR frequency. Yet contrary to the static value used for such look-up tables, DRAM efficiency is a dynamic value that may decrease as the DDR frequency increases, (e.g., because of increased operational overheads, etc.). For example, the DRAM efficiency may less across all or varying DDR frequencies in high-density DDR memory devices compared to lower-density memory devices. In addition, DRAM and DDR refresh rates may increase with temperature. This may be particularly important in applications with potentially high-temperature scenarios, such as in automotive SOCs. In addition, higher DRAM refresh rates may contribute to reduced DRAM efficiency (e.g., in configurations with 1 Gb DDR density, etc.). For these and other reasons, using a static DRAM efficiency value across a spectrum of variables may lead to adverse effects, notably in terms of power utilization. If the identified DDR frequency is higher than what is actually needed, it may result in an undesired power impact, thereby reducing the energy efficiency of the system.

Various embodiments include computing devices configured to compute and use a DRAM efficiency value to control DCVS operations in the device. The computing device may be configured to account for the dynamic nature of DRAM efficiency (and thus variables such as DDR density, DRAM refresh rate, etc.) for improved DCVS operations, DRAM utilization, DDR bandwidth management, etc.

In some embodiments, the computing device may be equipped with a component that implements a framework for appropriate DRAM efficiency calculation and effective utilization of LLC (herein "FADE component").

In some embodiments, the FADE component may be configured to implement a four-stage process that includes dynamic LLC allocation, DRAM efficiency calculations with dynamic parameters, PASR and other dynamic factor considerations, and workload prioritization. The FADE component may implement a multi-stage approach that dynamically allocates cache and adjusts DDR frequencies, better utilizes system resources, and/or otherwise improves the efficiency of the functions of various subsystems in computing devices.

In some embodiments, the FADE component may be configured to determine the DRAM efficiency value based on a robust set of parameters. By leveraging a wide range of parameters, the FADE component may more accurately determine or characterize DRAM performance, which may in turn allow for smarter system resource allocation and power management to conserve power, reduce latency, increase data throughput, etc. Examples of parameters that may be considered by the FADE component include DRAM refresh rate, DDR density, cache miss rate, memory access latency, and power consumption.

In some embodiments, the FADE component may be configured to implement and use a trigger mechanism to dynamically modify DDR operating frequency and voltage corner. DDR operating frequency may be rate at which the DDR memory operates (typically measured in megahertz (MHz)). The DDR operating frequency may determine how quickly data may be read from or written to the memory, which may in turn influence overall system performance. Voltage corners may indicate specific voltage conditions under which a semiconductor, such as DDR memory, is known to function correctly. A voltage corner often includes a range of voltages within which the DDR is stable and operates efficiently. The trigger mechanism may be an automated or semi-automated task or process that initiates changes in the DDR's operating parameters, such as the frequency and voltage corner. In some embodiments, the trigger mechanism may be event-driven and/or may be activated by several types of occurrences or conditions, such as a sudden increase in computational tasks requiring heavy memory usage, low battery levels, high-temperature readings from the DRAM, QoS metrics for tasks have varying priority levels, etc.

In some embodiments, the FADE component may be configured to dynamically allocate cache to high-demand, or "aggressive," clients to improve bandwidth utilization and thermal management (e.g., reduce DDR bandwidth (BW) requirements, lower the temperature in the device, etc.). By using cache more effectively, the FADE component may reduce the amount of data that needs to be transferred between the CPU and DDR memory, thereby reducing the overall DDR bandwidth requirements. In addition, less frequent access to DDR memory may reduce the electrical operations, which may in turn lead to a reduction in the device's thermal output.

In some embodiments, the FADE component may be configured to perform stage 1 operations that include monitoring to detect changes in DDR BW requirements, interrupting the DDR Subsystem (DDRSS) to determine the availability of unused LLC lines in response to detecting a change in DDR BW requirements, allocating the available unused LLC lines to aggressive clients or clients with higher DDR BW requirements, and sending feedback to the clients allocated the unused LLC lines to cause them to update their DDR BW requirements.

In some embodiments, the FADE component may be configured to perform stage 2 operations that include monitoring for DRAM refresh rate changes, determining the DRAM efficiency, DDR frequency, and other similar values based on information stored in a pre-computed database that includes parameters (e.g., DDR density, refresh rate, BW, etc.) that facilitate the selection of the appropriate frequency, update the values to account for features such as PASR that contribute to variations in DRAM efficiency, check the active DRAM status to identify the suitable DDR frequency, and update the DDR frequency each time there is a change in DRAM refresh rate or BW.

In some embodiments, the FADE component may be configured to perform stage 3 operations that include determining whether a higher DDR frequency is beneficial, determining whether the DDR is already at its maximum frequency in response to determining that a higher DDR frequency is beneficial, invoking a Last-Level Cache Controller (LLCC) to identify least recently used cache ways (pathways, channels, etc.) for reallocation (or the "Least Frequently Used," "Not Most recently Used," or "Most recently used", etc.), flushing dirty caches prior to allocation of unused LLC lines to aggressive clients, and sending feedback to aggressive clients to update their DDR BW requirements following LLC allocation.

In some embodiments, the FADE component may be configured to perform stage 4 operations that include using an active use-case governor (AUG) component running on the application processor subsystem (APSS) to maintain a priority table of subsystems. The priority table generated by an AUG component may be a dynamic entity (i.e., not static), and thus the priorities of the subsystems may change dynamically if multiple use cases are running. The priory table may include information that considers latency requirements and categorizes subsystems into real-time and non-real-time, as well as foreground and background clients. The FADE component may also determine whether further optimization is beneficial and restrict the operations of subsystems with low priority and high DDR BW requirements (or place them into low-power modes, etc.) in response to determining that further optimization is beneficial.

The various embodiments may improve the performance and functioning of a computing device. As discussed above, DRAM efficiency is not static and is affected by many factors including DDR frequency, density, refresh rates, and temperatures. Conventional solutions often rely on fixed DRAM efficiency values, which may not account for real-world variations and/or may lead to imprecise frequency settings and suboptimal power usage in the computing device. Unlike conventional solutions, the FADE component may be configured to dynamically adjust and optimize DRAM efficiency value based on various system metrics and operating conditions and use the dynamically determined DRAM efficiency value to set the DDR frequencies (e.g., using DCVS, etc.) and other parameters (e.g., operating frequencies, etc.) in the device. In some embodiments, the FADE component may be configured to use a four-stage process to improve various aspects of memory and cache allocation, bandwidth management, and operational frequency settings. In some embodiments, the FADE component may be configured to characterize the DRAM performance and efficiency more precisely by using any of a multitude of parameters, including DRAM refresh rates, DDR density, cache miss rates, memory access latency, and power consumption. Characterization of DRAM performance may be based on empirical curve fitting models and AI/ML methods. In some embodiments, the FADE component may be configured to dynamically adjust DDR frequencies and other operational parameters in response to detecting specific conditions or events, such as a surge in computational tasks. In some embodiments, the FADE component may be configured to improve system performance and reduce power consumption in the device by dynamically allocating resources based on real-time demands and metrics. In some embodiments, the FADE component may be configured to integrate with other components such as a Last-Level Cache Controller (LLCC) and an active use-case governor (AUG) to offer more granular control over system resource usage and/or otherwise further improve the performance and battery consumption characteristics of the computing device. For all these reasons, the various embodiments may improve the performance and functioning of a computing device. Additional improvements and enhancements to the performance and functioning of the computing device will be apparent from the disclosures below.

Various embodiments may be implemented on a number of single-processor and multiprocessor computer systems, including a system-on-chip (SOC) or system in a package (SIP). FIG. 1 illustrates an example computing system or SIP 100 architecture that may be used in mobile computing devices implementing a continuous speech-monitoring artificial intelligence (AI) system in accordance with various embodiments.

With reference to FIG. 1, the illustrated example SIP 100 includes two SOCs 102, 104, a clock 106, a voltage regulator 108, and a wireless transceiver 166. The first and second SOC 102, 104 may communicate via interconnection bus 150. The various processors 110, 112, 114, 116, 118, 121, 122, may be interconnected to each other and to one or more memory elements 120, system components and resources 124, and a thermal management unit 132 via an interconnection bus 126, which may include advanced interconnects such as high-performance networks-on-chip (NOCs). Similarly, the processor 152 may be interconnected to the power management unit 154, the mmWave transceivers 156, memory 158, and various additional processors 160 via the interconnection bus 164. These interconnection buses 126, 150, 164 may include an array of reconfigurable logic gates and/or implement a bus architecture (e.g., Core-Connect, AMBA, etc.). Communications may be provided by advanced interconnects, such as NOCs.

In various embodiments, any or all of the processors 110, 112, 114, 116, 121, 122, in the system may operate as the SoC's main processor, central processing unit (CPU), microprocessor unit (MPU), arithmetic logic unit (ALU), etc. One or more of the coprocessors 118 may operate as the CPU.

In some embodiments, the first SOC 102 may operate as the central processing unit (CPU) of the mobile computing device that carries out the instructions of software application programs by performing the arithmetic, logical, control and input/output (I/O) operations specified by the instructions. In some embodiments, the second SOC 104 may operate as a specialized processing unit. For example, the second SOC 104 may operate as a specialized 5G processing unit responsible for managing high volume, high speed (e.g., 5 Gbps, etc.), and/or very high-frequency short wavelength (e.g., 28 GHz mmWave spectrum, etc.) communications.

The first SOC 102 may include a digital signal processor (DSP) 110, a modem processor 112, a graphics processor 114, an application processor 116, one or more coprocessors 118 (e.g., vector co-processor, CPUCP, etc.) connected to one or more of the processors, memory 120, deep processing unit (DPU) 121, artificial intelligence processor 122, system components and resources 124, an interconnection bus 126, one or more temperature sensors 130, a thermal management unit 132, and a thermal power envelope (TPE) component 134. The second SOC 104 may include a 5G modem processor 152, a power management unit 154, an interconnection bus 164, a plurality of mmWave transceivers 156, memory 158, and various additional processors 160, such as an applications processor, packet processor, etc.

Each processor 110, 112, 114, 116, 118, 121, 122, 121, 122, 152, 160 may include one or more cores, and each processor/core may perform operations independent of the other processors/cores. For example, the first SOC 102 may include a processor that executes a first type of operating system (e.g., FreeBSD, LINUX, OS X, etc.) and a processor that executes a second type of operating system (e.g., MICROSOFT WINDOWS 11). In addition, any or all of the processors 110, 112, 114, 116, 118, 121, 122, 121, 122, 152, 160 may be included as part of a processor cluster architecture (e.g., a synchronous processor cluster architecture, an asynchronous or heterogeneous processor cluster architecture, etc.).

Any or all of the processors 110, 112, 114, 116, 118, 121, 122, 121, 122, 152, 160 may operate as the CPU of the mobile computing device. In addition, any or all of the processors 110, 112, 114, 116, 118, 121, 122, 121, 122, 152, 160 may be included as one or more nodes in one or more CPU clusters. A CPU cluster may be a group of interconnected nodes (e.g., processing cores, processors, SOCs, SIPs, computing devices, etc.) configured to work in a coordinated manner to perform a computing task. Each node may run its own operating system and contain its own CPU, memory, and storage. A task that is assigned to the CPU cluster may be divided into smaller tasks that are distributed across the individual nodes for processing. The nodes may work together to complete the task, with each node handling a portion of the computation. The results of each node's computation may be combined to produce a final result. CPU clusters are especially useful for tasks that can be parallelized and executed simultaneously. This allows CPU clusters to complete tasks much faster than a single, high-performance computer. Additionally, because CPU clusters are made up of multiple nodes, they are often more reliable and less prone to failure than a single high-performance component.

The first and second SOC 102, 104 may include various system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources 124 of the first SOC 102 may include power amplifiers, voltage regulators, oscillators, phase-locked loops, peripheral bridges, data controllers, memory controllers, system controllers, Access ports, timers, and other similar components used to support the processors and software clients running on a computing device. The system components and resources 124 may also include circuitry to interface with peripheral devices, such as cameras, electronic displays, wireless communication devices, external memory chips, etc.

The first and/or second SOCs 102, 104 may further include an input/output module (not illustrated) for communicating with resources external to the SOC, such as a clock 106, a voltage regulator 108, and a wireless transceiver 166 (e.g., cellular wireless transceiver, Bluetooth transceiver, etc.). Resources external to the SOC (e.g., clock 106, voltage regulator 108, wireless transceiver 166) may be shared by two or more of the internal SOC processors/cores.

In addition to the example SIP 100 discussed above, various embodiments may be implemented in various computing systems, including a single processor, multiple processors, multicore processors, or any combination thereof.

Figure 2:
FIG. 2 is a component block diagram illustrating example components and operations in a system configured to implement some embodiments.
Figure 2:
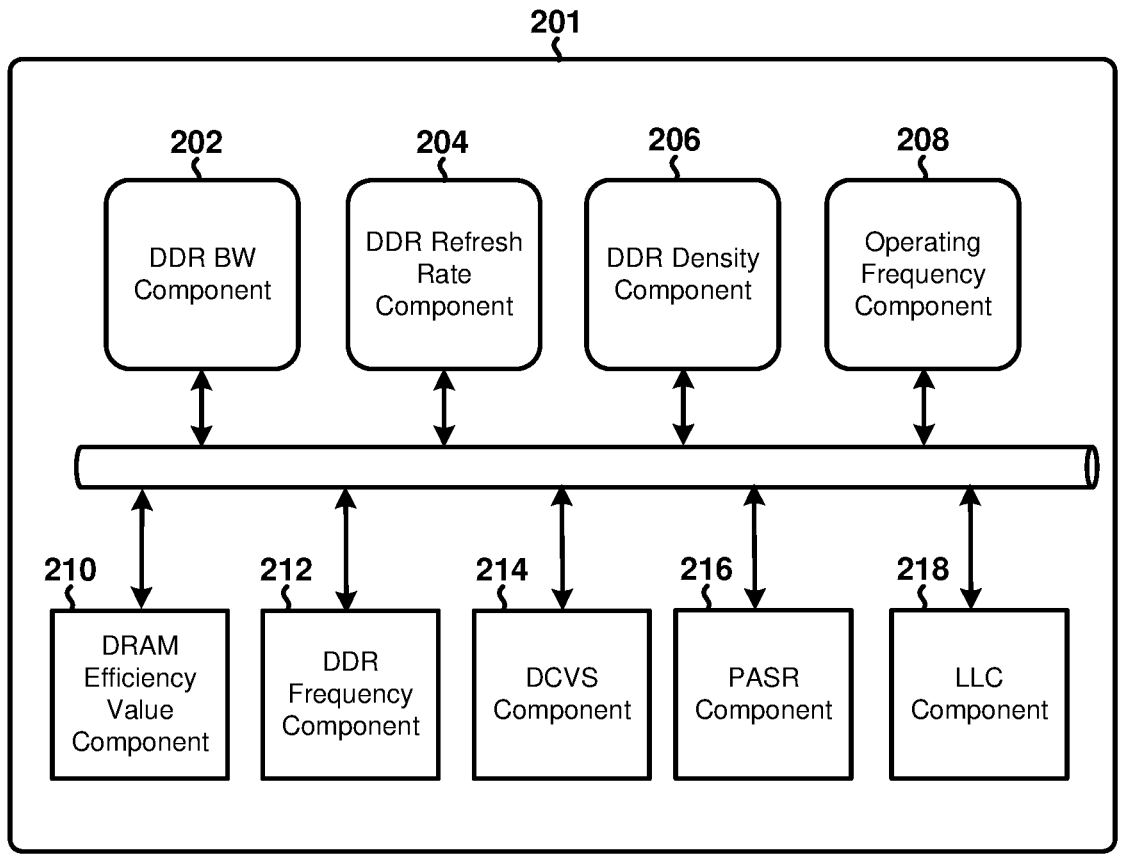

FIG. 2 illustrates example components that could be included in a system configured to implement an improved DRAM efficiency calculation and more effective utilization of LLC in accordance with the embodiments. With reference to FIGS. 1 and 2, a system 200 (e.g., SIP 100, SOCs 102, 104, etc.) may include a FADE component 201 that includes a double data rate (DDR) bandwidth (BW) component 202, a DDR refresh rate component 204, a DDR density component 206, an operating frequency component 208, a DRAM efficiency value component 210, a DDR frequency component 212, a DCVS component 214, a PASR component 216, and a LLC component 218.

The DDR BW component 202 may be configured to determine whether a new DDR BW requirement has been received for a DDR DRAM in the computing system 200. The DDR refresh rate component 204 may be configured to determine whether there are changes in a DDR refresh rate of the DDR DRAM. The DDR density component 206 may be configured to determine whether there are changes in the DDR density of the DDR DRAM. The operating frequency component 208 may be configured to determine whether the DDR DRAM is operating at an upper frequency of operation. The upper frequency of operation may be a maximum operating frequency of the memory device, a maximum operating frequency of the computing device in which the memory device is installed, a threshold frequency above which an application, other component or subsystem may experience decreased performance or increased errors, etc. The DRAM efficiency value component 210 may be configured to dynamically determine and repeatedly update the DRAM efficiency value based on various factors, such as the DDR BW requirements, DRAM losses, operational overheads, DDR density, DRAM refresh rates, DDR frequencies, temperature conditions, etc. The DDR frequency component 212 may be configured to dynamically determine and update the DDR frequency value based on DRAM efficiency value.

The DCVS component 214 may be configured to dynamically scale the clock frequency, DDR frequency, and supply voltage based on DDR frequency value, the DRAM efficiency value, workload requirements, etc. to balance tradeoffs between performance and energy consumption. The PASR component 216 may be configured to perform various power-saving operations, such as selectively refreshing only those portions of the memory array that are in active use while allowing other, unused sections to enter a low-power state. The LLC component 218 may be configured to assign LLC lines to clients, determine the availability of unused LLC lines (or pathways, channels, etc.), dynamically reassign unused LLC lines to high DDR BW demand clients (aggressive clients), flush underutilized LLC lines, etc.

FIGS. 3A-3E are process flow diagrams illustrating a method 300 of improving the performance and battery consumption characteristics of a computing system by improving the usage of DRAM and LLC in the computing system in accordance with some embodiments. With reference to FIGS. 1-3E, the method 300 may be performed in a computing device by processing system encompassing one or more processors (e.g., 110, 112, 114, 116, 118, 121, 122, 121, 122, 152, 160, etc.), components or subsystems discussed in this application. Means for performing the functions of the operations in the method 300 may include a processing system including one or more of processors 110, 112, 114, 116, 118, 121, 122, 121, 122, 152, 160, and other components described herein. Further, one or more processors of a processing system may be configured with software or firmware to perform some or all of the operations of the method 300. In order to encompass the alternative configurations enabled in various embodiments, the hardware implementing any or all of the method 300 is referred to herein as a "processing system."

With reference to FIGS. 1-3A, in determination block 302, the processing system may determine whether a new Double Data Rate Bandwidth (DDR BW) requirement has been received. In some embodiments, the processing system may determine if a new DDR BW requirement has been received by monitoring system calls or application-level instructions that affect memory access patterns. The processing system may also inspect its data flows and/or use observing metrics such as the cache miss ratio to estimate bandwidth needs for various data storage and retrieval operations. For example, a higher-than-expected cache miss ratio may suggest that an adjustment in DDR BW could be beneficial. In some embodiments, the processing system may be configured to receive explicit commands from other hardware components or software layers that indicate a new DDR BW requirement.

In some embodiments, the processing system may be configured to receive and use event triggers (e.g., from built-in monitoring systems) to determine whether DDR BW usage has reached a predetermined threshold. In some embodiments, the processing system may be configured to receive the DDR BW requirement information from directly from a resource manager of the computing device. In some embodiments, the processing system may be configured to periodically poll specific registers or memory locations to check for new requirements. In some embodiments, the processing system may be configured to use the length and wait times of memory-related queues to determine if a new DDR BW requirement has been received. In some embodiments, the processing system may be configured to use adaptive feedback mechanisms to assess performance metrics and dynamically adjust system parameters, including changes in DDR BW requirements.

In response to determining that a new DDR BW requirement was not received (i.e., determination block 302="No"), the processing system may determine whether there are any changes in the DDR refresh rate or DDR density in determination block 304. For example, the processing system may query specific hardware registers that store information related to the DDR refresh rate and density, monitor system events or alerts generated by the memory controller or other components of the hardware subsystem to detect changes in memory characteristics such as refresh rate and density, receive notifications from a specialized resource manager indicating that there are chances to the DDR settings, read information stored in operating system logs or hardware logs, issue commands that solicit real-time status updates from the memory controller or DDR modules, etc.

In response to determining that a new DDR BW requirement was received (i.e., determination block 302="Yes"), the processing system may perform stage 1 operations in block 310. The stage 1 operations in block 310 are discussed in detail below with reference to FIG. 3B.

In response to determining that there are no changes in the DDR refresh rate or DDR density (i.e., determination block 304="No"), the processing system may determine whether the DDR memory is operating at its maximum frequency of operation (or its maximum operating frequency, upper frequency limit, etc.) in determination block 306. For example, the processing system may read specific hardware registers that contain information regarding the current operating frequency of the DDR memory, read event logs or notifications generated by the memory controller or other system components, observe system-level metrics and performance indicators, and/or perform other similar operations to determine whether the DDR memory is operating at its maximum frequency of operation. Generally, latency and throughput for memory access are inversely related to the memory's operating frequency. As such, in some embodiments, the processing system may be configured to determine that the DDR memory is operating at its upper-frequency limit in response to determining that the latency and throughput metrics are at levels consistent with maximum performance.

In response to determining that there are changes in the DDR refresh rate or DDR density (i.e., determination block 304="Yes"), the processing system may perform stage 2 operations in block 330. The stage 2 operations in block 330 are discussed in detail below with reference to FIG. 3C.

In response to determining that the DDR memory is not operating at its maximum frequency of operation (i.e., determination block 306="No"), the processing system may monitor to determine whether a new DDR BW requirement was received in block 302.

In response to determining that the DDR memory is operating at its maximum frequency of operation (i.e., determination block 306="Yes"), the processing system may perform stage 3 operations in block 350. The stage 3 operations in block 350 are discussed in detail below with reference to FIG. 3D.

In determination block 308, the processing system may determine whether further adjustments to the DRAM efficiency value are beneficial. In some embodiments, the processing system may account for various trade-offs between performance and power consumption associated with accomplishing the current objectives based on current operating conditions. In some embodiments, the processing system may monitor system performance metrics (e.g., memory latency, throughput, cache miss rates, etc.) and determine that further adjustments to the DRAM efficiency value are beneficial based on whether performance metrics deviate from expected or optimal values.

In response to determining that further adjustments to the DRAM efficiency value are not beneficial (i.e., determination block 308="No"), the processing system may monitor to determine whether a new DDR BW requirement was received in block 302.

In response to determining that further adjustments to the DRAM efficiency value are beneficial (i.e., determination block 308="Yes"), the processing system may perform stage 4 operations in block 370 and monitor to determine whether a new DDR BW requirement was received in block 302. The stage 4 operations in block 370 are discussed in detail below with reference to FIG. 3E.

Figure 3A:
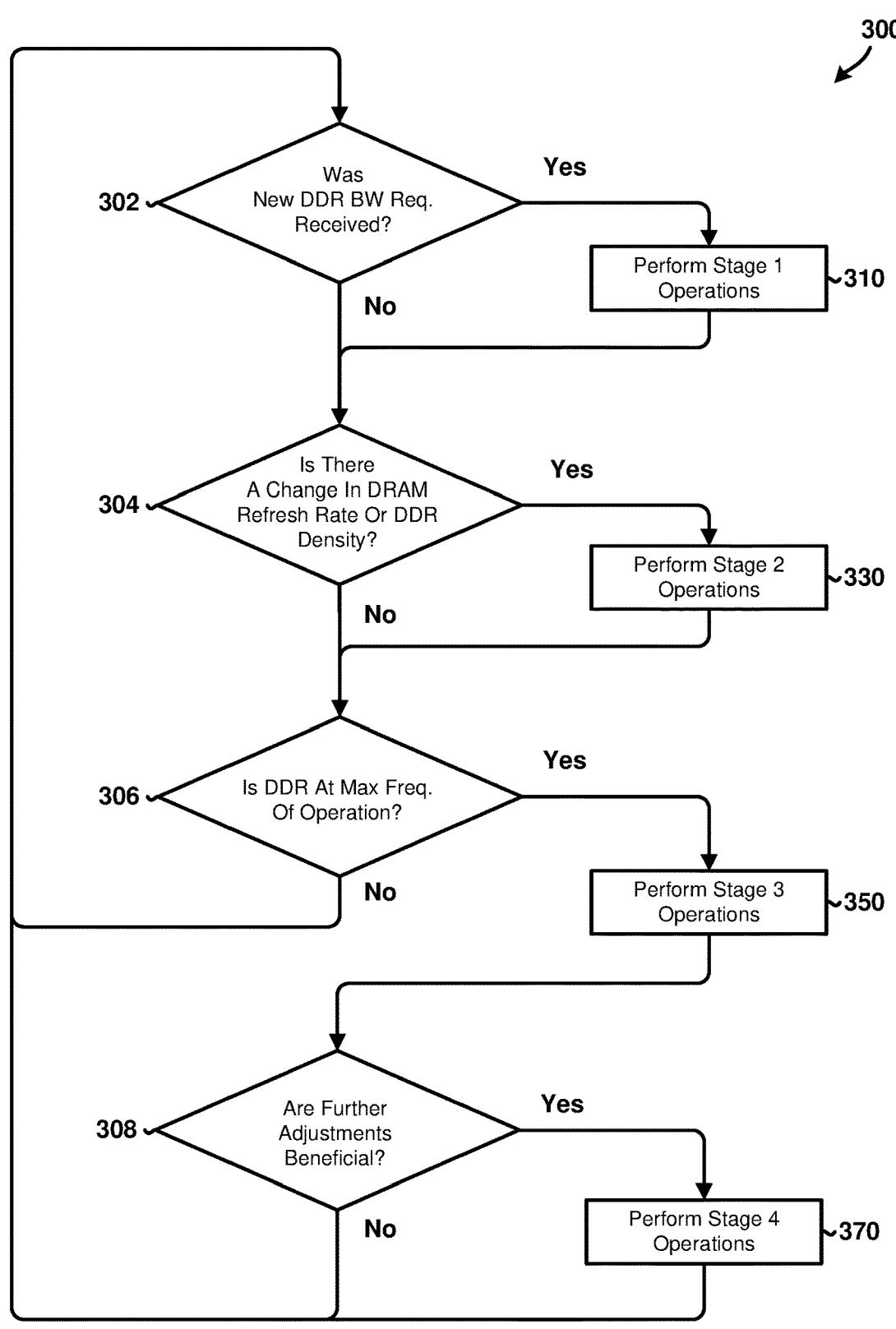
Figure 3B:
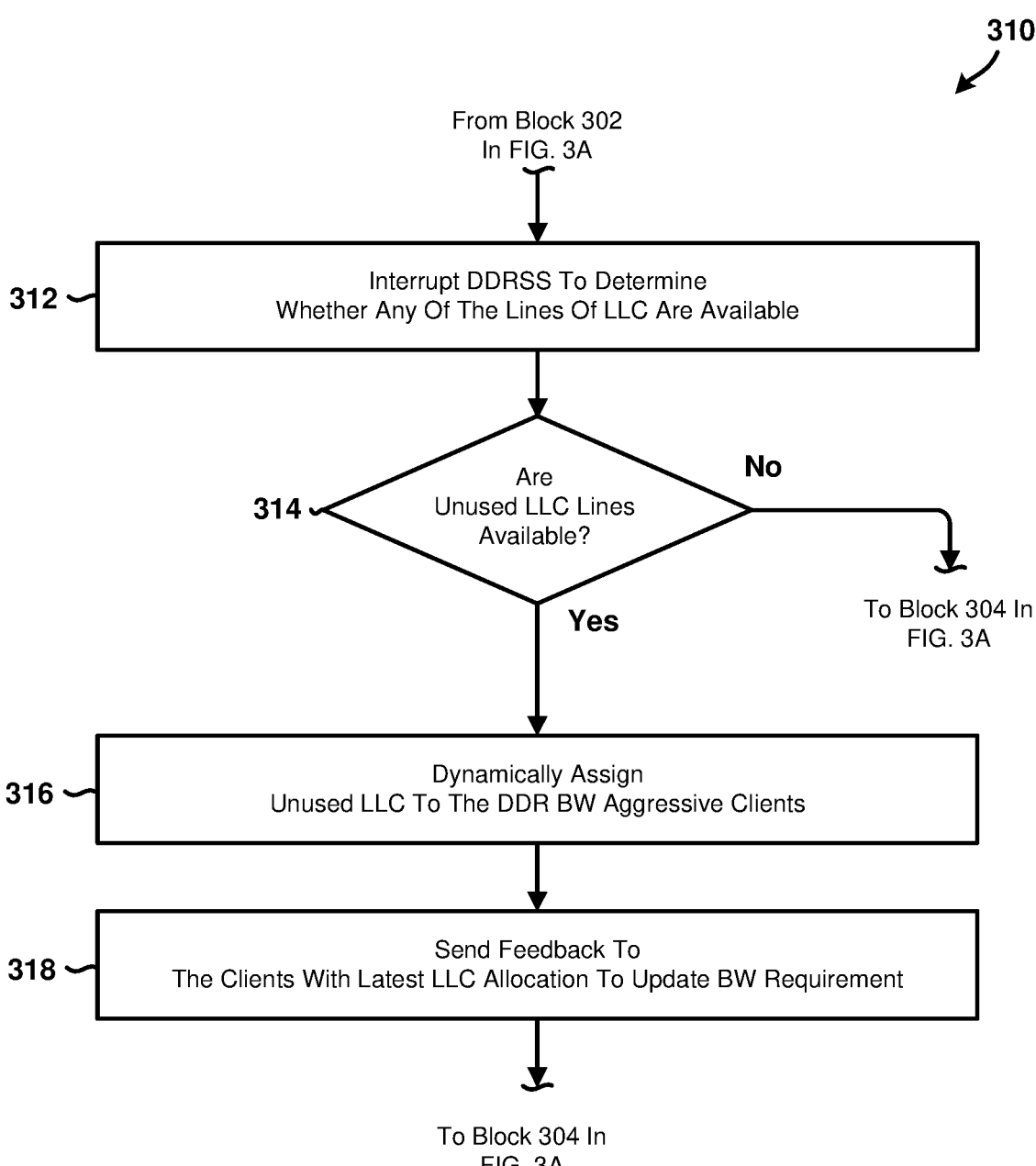

Example operations that may be performed in stage 1 are illustrated in FIG. 3B. With reference to FIGS. 1-3B, in block 312, the processing system may interrupt the DDR Subsystem (DDRSS) to determine whether any of the lines of LLC are available.

In determination block 314, the processing system may determine whether unused LLC lines are available. In some embodiments, the processing system may issue an interrupt signal that momentarily halts or modifies the standard operations of the DDRSS in order to perform a specific check on the LLC. The interrupt may direct the memory controller to conduct a query or survey of the LLC to determine whether lines are currently available. In some embodiments, the processing system may use special control registers or system commands that trigger a status check on the LLC. After issuing such a command, the processing system may read back the results from designated registers or memory locations in which the DDRSS or LLC writes the availability information. In some embodiments, the processing system may invoke APIs or system calls associated with operating system-level functions or dedicated resource management software in the computing system to determine LLC line availability.

In response to determining that there are no unused LLC lines available (i.e., determination block 314="No"), the processing system may determine whether there are any changes in the DDR refresh rate or DDR density in determination block 304.

In response to determining that there are unused LLC lines available (i.e., determination block 314="Yes"), the processing system may dynamically assign the unused LLC line to the DDR BW aggressive clients in block 316.

In block 318, the processing system may send feedback to the clients with latest LLC allocation to update their BW requirements. The processing system may then perform the operations in determination block 304 of the method 300 as described.

Figures 3A, 3C:
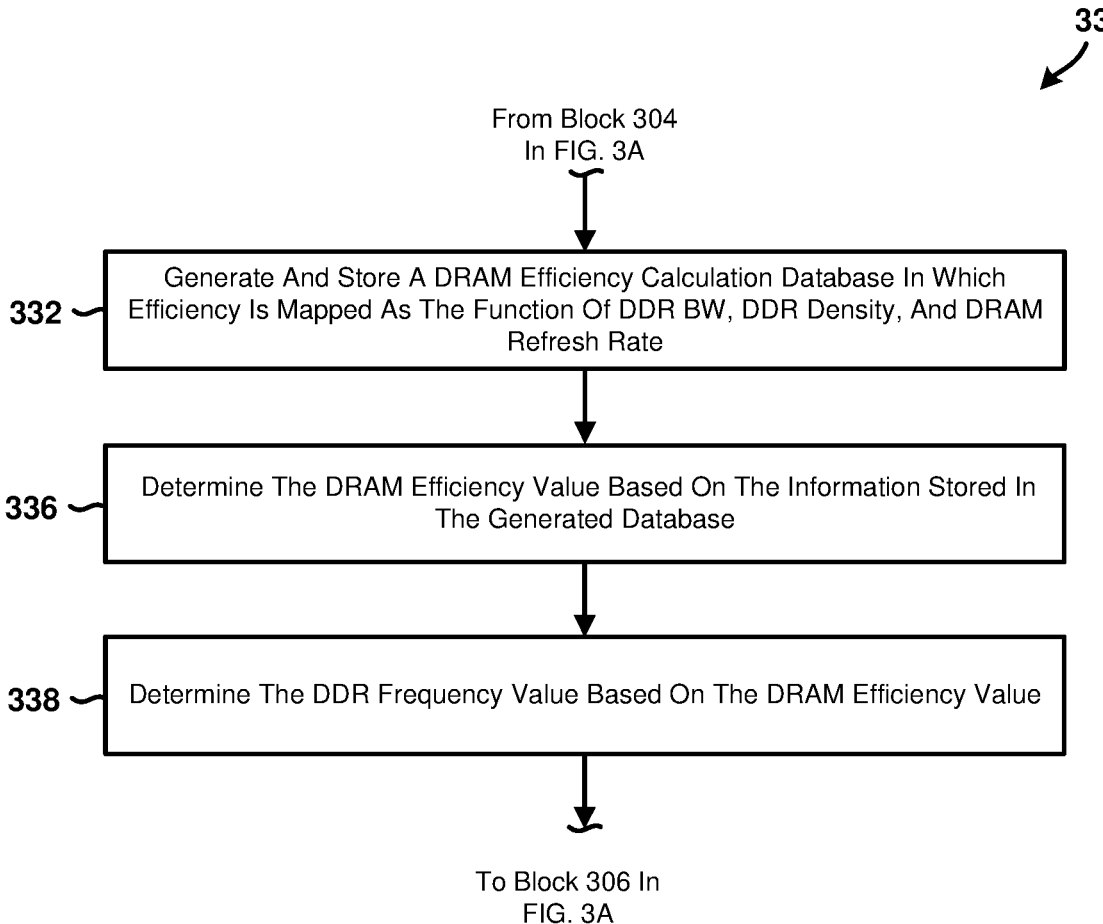

Example operations that may be performed in stage 2 are illustrated in FIG. 3C. With reference to FIGS. 1-3C, in block 332, the processing system may generate and store a DRAM efficiency calculation database in which efficiency is mapped as the function of DDR BW, DDR density, and DRAM refresh rate.

In block 334, the processing system may determine the DRAM efficiency value based on the information stored in the generated database.

In block 336, the processing system may determine the DDR frequency value based on the DRAM efficiency value. The processing system may then perform the operations in determination block 306 of the method 300 as described.

Figure 3D:
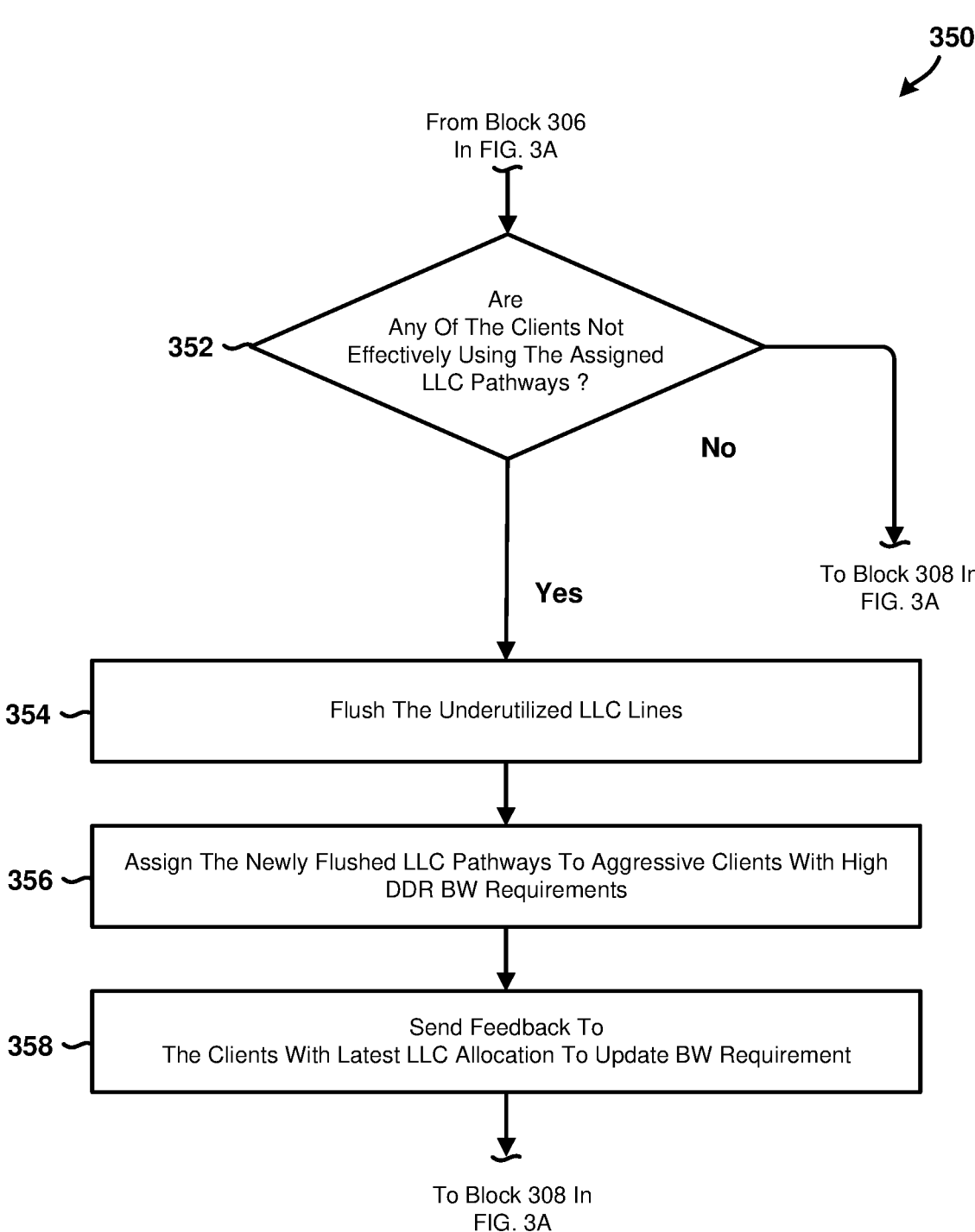

Example operations that may be performed in stage 3 are illustrated in FIG. 3D. With reference to FIGS. 1-3D, in determination block 352, the processing system may determine whether any of the clients are not effectively using the assigned LLC pathways.

In response to determining that all of the clients are using their assigned LLC pathways effectively (i.e., determination block 352="No"), the processing system may determine whether further adjustments to the DRAM efficiency value are beneficial in determination block 308.

In response to determining that a client is not using its assigned LLC pathways effectively (i.e., determination block 352="Yes"), the processing system may flush the underutilized LLC lines in block 354.

In block 356, the processing system may assign the newly flushed LLC pathways to aggressive clients with high DDR BW requirements.

In block 358, the processing system may send feedback to the clients with latest LLC allocation to update their BW requirements. The processing system may then perform the operations in determination block 308 of the method 300 as described.

Example operations that may be performed in stage 4 are illustrated in FIG. 3E. With reference to FIGS. 1-3E, in block 372, the processing system may use an active use-case governor (AUG) component running on the application processor subsystem (APSS) to update and/or maintain a dynamic priority table of subsystems that includes information that considers latency requirements and categorizes subsystems into real-time and non-real-time, as well as foreground and background clients.

The priority table may be dynamic so that the priorities of the subsystems in the priority table may be changed dynamically if multiple use-cases are running. In block 374, the processing system may determine the subsystems that may be put into low-power mode (LPM) based on the generated priority table of subsystems.

In block 376, the processing system may identify the low priority subsystems that include high DDR BW requirements.

In block 378, the processing system may cause the identified subsystems to enter their low power modes to reduce the DDR BW requirement. The processing system may repeat the operations of the method 300 continuously, periodically or episodically by again performing the operations in determination block 302 as described.

Thus, as described in detail above, in various embodiments the FADE component may be configured to dynamically allocate LLC to high BW clients, determine DDR bandwidth based on refresh rate and effective DRAM size, dynamically reallocate underutilized lines to high BW clients if DDR at max frequency, and/or assign DDR BW to clients based on application priorities (e.g., dynamic priority table, etc.).

Figure 4:
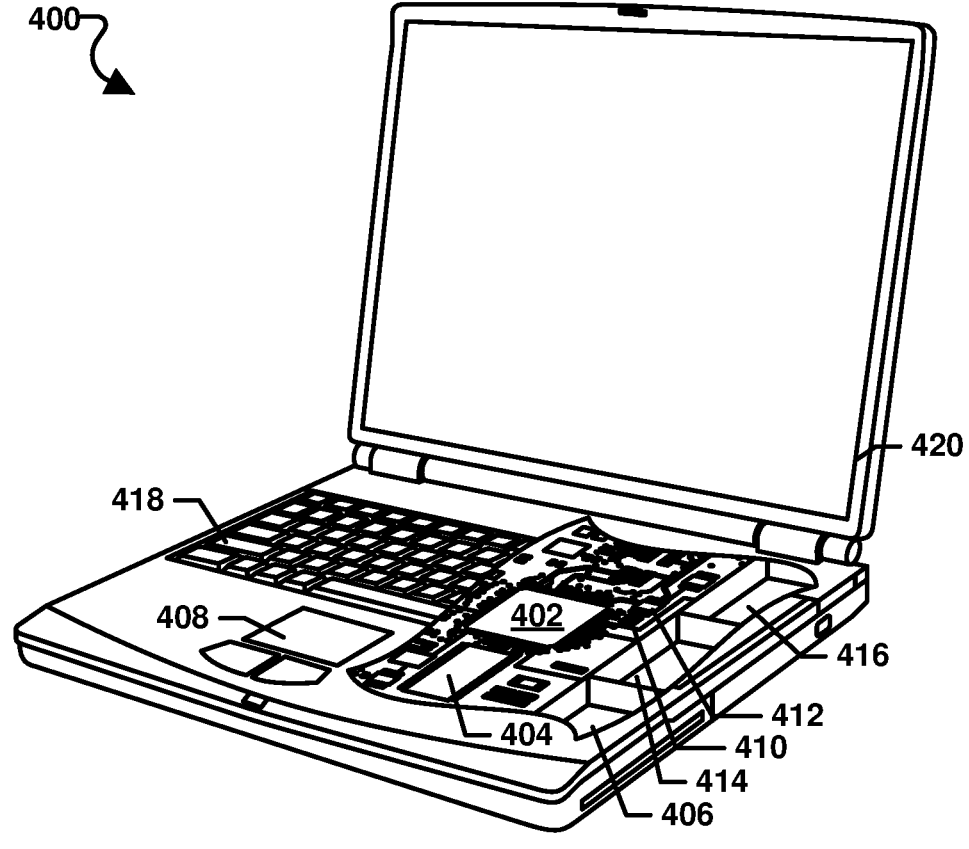
FIG. 4 is a component block diagram illustrating an example computing device in the form of a laptop that is suitable for implementing some embodiments.

Various embodiments (including, but not limited to, embodiments described above with reference to FIGS. 1-3E) may be implemented in a wide variety of wireless devices and computing systems including a laptop computer 400, an example of which is illustrated in FIG. 4. With reference to FIGS. 1-4, a laptop computer may include a processor 402 coupled to volatile memory 404 and a large capacity non-volatile memory, such as a disk drive 406 of Flash memory. The laptop computer 400 may include a touchpad touch surface 408 that serves as the computer's pointing device, and thus may receive drag, scroll, and flick gestures. Additionally, the laptop computer 400 may have one or more antenna 410 for sending and receiving electromagnetic radiation that may be connected to a wireless data link and/or cellular telephone transceiver 412 coupled to the processor 402. The computer 400 may also include a BT transceiver 414, a compact disc (CD) drive 416, a keyboard 418, and a display 420 all coupled to the processor 402. Other configurations of the computing device may include a computer mouse or trackball coupled to the processor (e.g., via a universal serial bus (USB) input) as are well known, which may also be used in conjunction with various embodiments.

Figure 5:
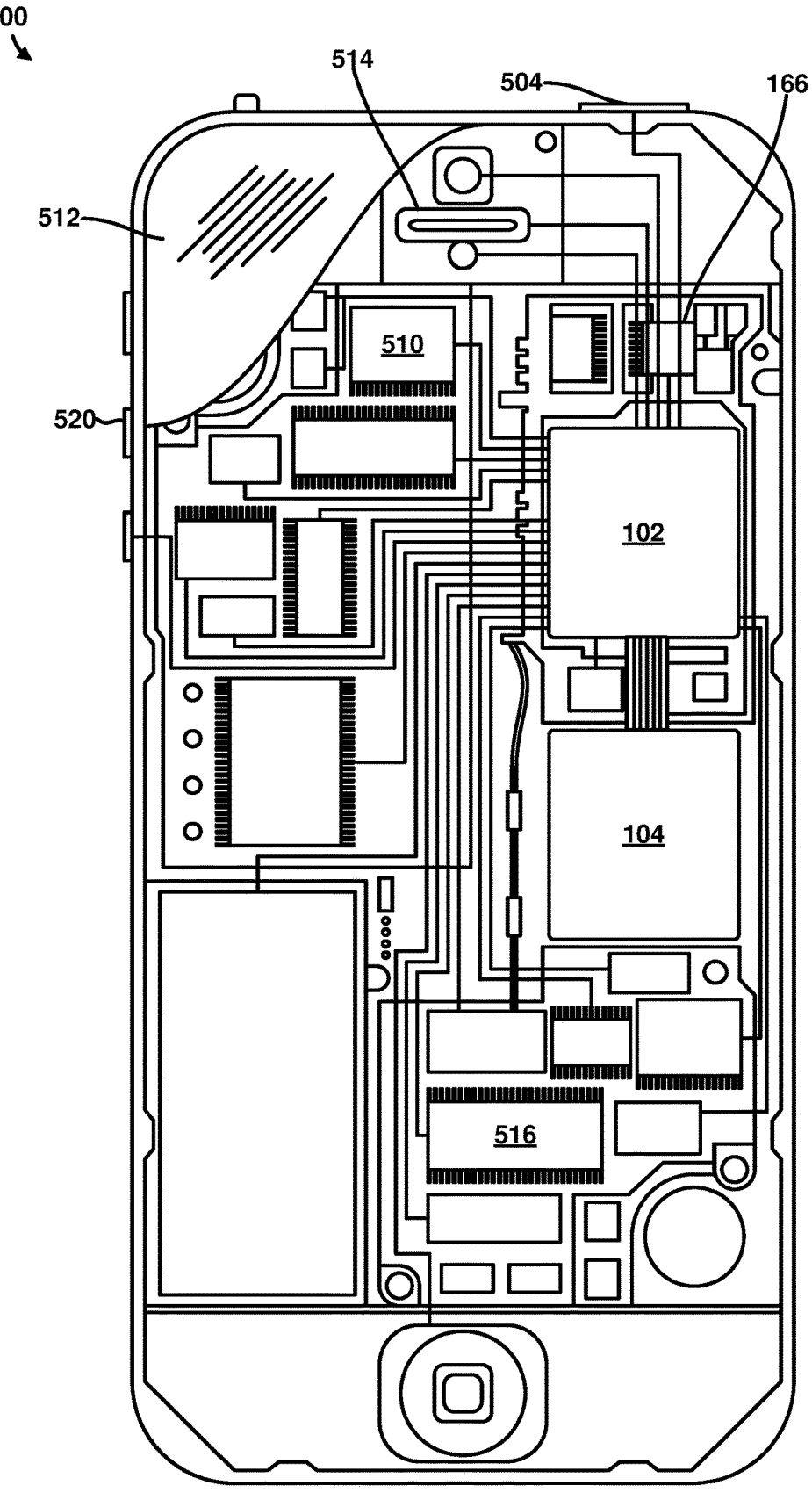
FIG. 5 is a component block diagram illustrating an example wireless communication device suitable for use with various embodiments.

FIG. 5 is a component block diagram of a computing device 500 suitable for use with various embodiments. With reference to FIGS. 1-5, various embodiments may be implemented on a variety of computing devices 500, an example of which is illustrated in FIG. 5 in the form of a smartphone. The computing device 500 may include a first SOC 102 coupled to a second SOC 104. The first and second SoCs 102, 104 may be coupled to internal memory 516, a display 512, and to a speaker 514. The first and second SOCs 102, 104 may also be coupled to at least one subscriber identity module (SIM) 540 and/or a SIM interface that may store information supporting a first 5GNR subscription and a second 5GNR subscription, which support service on a 5G non-standalone (NSA) network.

The computing device 500 may include an antenna 504 for sending and receiving electromagnetic radiation that may be connected to a wireless transceiver 166 coupled to one or more processors in the first and/or second SOCs 102, 104. The computing device 500 may also include menu selection buttons or rocker switches 520 for receiving user inputs.

The computing device 500 also includes a sound encoding/decoding (CODEC) circuit 510, which digitizes sound received from a microphone into data packets suitable for wireless transmission and decodes received sound data packets to generate analog signals that are provided to the speaker to generate sound. Also, one or more of the processors in the first and second circuitries 102, 104, wireless transceiver 166 and CODEC 510 may include a digital signal processor (DSP) circuit (not shown separately).

Figure 6:
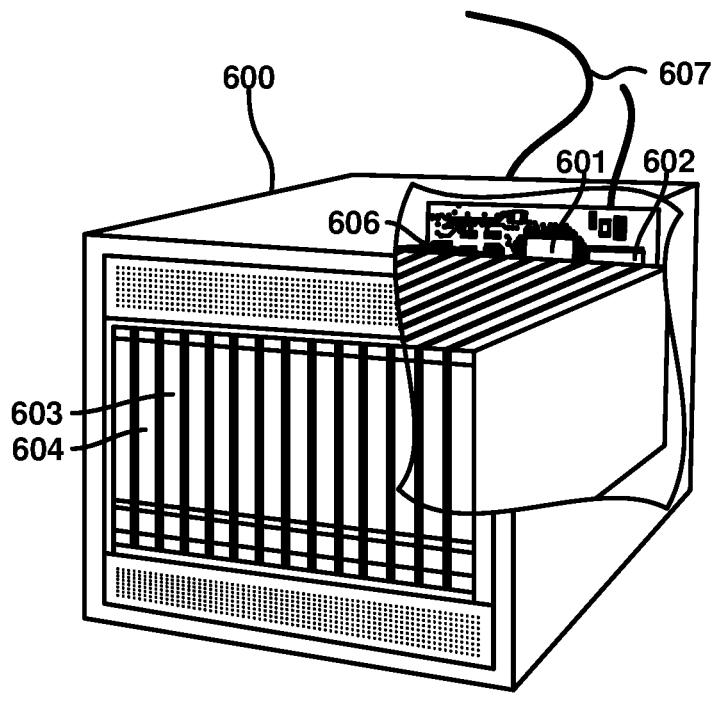
FIG. 6 is a component diagram of an example server suitable for implementing some embodiments.

Some embodiments may be implemented on any of a variety of commercially available computing devices, such as the server computing device 600 illustrated in FIG. 6. Such a server device 600 may include a processor 601 coupled to volatile memory 602 and a large capacity non-volatile memory, such as a disk drive 603. The server device 600 may also include a floppy disc drive, USB, etc. coupled to the processor 601. The server device 600 may also include network access ports 606 coupled to the processor 601 for establishing data connections with a network connection circuit 604 and a communication network 607 (e.g., an Internet protocol (IP) network) coupled to other communication system network elements.

The processors or processing units discussed in this application may be any programmable microprocessor, microcomputer, or multiple processor chip or chips that can be configured by software instructions (applications) to perform a variety of functions, including the functions of various embodiments described. In some computing devices, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device including a processor configured (e.g., with processor-executable instructions) to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1: A method of improving memory bandwidth in a computing device, the method including determining whether a new double data rate (DDR) bandwidth (BW) requirement has been received for a DDR dynamic random-access memory (DRAM) in the computing device, determining whether there are changes in a DDR refresh rate or a DDR density of the DDR DRAM, determining whether the DDR DRAM is operating at an upper frequency of operation, and determining a DRAM efficiency value based on at least one or more of whether the new DDR BW requirement has been received, whether there are changes in the DDR refresh rate or the DDR density, or whether the DDR DRAM is operating at the upper frequency of operation.

Example 2: The method of example 1, further including using the determined DRAM efficiency value to perform dynamic clock and voltage scaling (DCVS) operations that scale a clock frequency, a DDR frequency, or a supply voltage in the computing device.

Example 3: The method of either of examples 1 or 2, further including determining an availability of unused last level cache (LLC) lines in response to determining that a new DDR BW requirement has been received, dynamically assigning the unused LLC lines to high DDR BW demand clients, and sending feedback to the high DDR BW demand clients to update BW requirements.

Example 4: The method of any of examples 1-3, in which determining whether there are changes in the DDR refresh rate or the DDR density of the DDR DRAM includes determining whether there are changes in the DDR refresh rate or the DDR density of the DDR DRAM in response to determining that a new DDR BW requirement has not been received.

Example 5: The method of any of examples 1-4, further including generating a datastore that maps DRAM efficiency as a function of DDR BW, DDR density, and DRAM refresh rate, determining the DRAM efficiency value based information included in the generated datastore, and determining a DDR frequency value based on the determined DRAM efficiency value.

Example 6: The method of any of examples 1-5, in which determining whether the DDR memory is operating at the upper frequency of operation is performed in response to determining that there are no changes in the DDR refresh rate or the DDR density of the DDR memory.

Example 7: The method of any of the examples 1-6, further including flushing an underutilized last level cache (LLC) line in response to determining that a client assigned the LLC line is not using the assigned LLC line effectively, assigning the newly flushed LLC line to a high DDR BW demand client, and sending feedback to the high DDR BW demand client to update BW requirements.

Example 8: The method of example 7, further including determining whether further adjustments to the DRAM efficiency value or assigned LLC line would better balance tradeoffs between performance and power consumption in the computing device.

Example 9: The method of example 8, further including in response to determining that further adjustments to the DRAM efficiency value or the assigned LLC line would better balance tradeoffs between performance and power consumption in the computing device determining subsystems of the computing device that may be put into a low-power mode (LPM) based on information stored in a priority table, traversing the determined subsystems to identify a low priority subsystem that includes a high DDR BW requirement, and causing the identified low priority subsystem to enter the LPM.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in a computing device, system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A computing device, comprising:
   a double data rate (DDR) dynamic random-access memory (DRAM) comprising a plurality of last level cache (LLC) lines; and
   a processor coupled to the DDR DRAM and configured to:
   issue an interrupt signal to the DRAM to determine whether one or more unused LLC lines among the plurality of LLC lines are currently available;
   dynamically assign the one or more unused LLC lines that are currently available to one or more high DDR bandwidth (BW) demand clients upon receiving one or more new DDR BW requirements from the one or more high DDR BW demand clients; and
   determine a DRAM efficiency value based on a dynamic assignment of the one or more unused LLC lines to the one or more high DDR BW demand clients, wherein the DRAM efficiency value is based at least in part on selectively refreshing, by a partial array self refresh (PASR) component, a first portion of the DRAM that is in active use, and deactivating, by the PASR component, a second portion of the DRAM that is not in active use.

2. The computing device of claim 1, wherein the processor is further configured to use the determined DRAM efficiency value to perform dynamic clock and voltage scaling (DCVS) operations that scale a clock frequency, a DDR frequency, or a supply voltage in the computing device.

3. The computing device of claim 1, wherein the processor is configured to determine whether there are changes in the DDR refresh rate or the DDR density of the DDR DRAM by determining whether there are changes in the DDR refresh rate or the DDR density of the DDR DRAM in response to determining that a new DDR BW requirement has not been received.

4. The computing device of claim 1, wherein the processor is further configured to:
  generate a datastore that maps DRAM efficiency as a function of DDR BW, DDR density, and DRAM refresh rate,
  determine the DRAM efficiency value based information included in the generated datastore; and
  determine a DDR frequency value based on the determined DRAM efficiency value.

5. The computing device of claim 1, wherein the processor is configured to determine whether the DDR memory is operating at the upper frequency of operation in response to determining that there are no changes in the DDR refresh rate or the DDR density of the DDR memory.

6. The computing device of claim 1, wherein the processor is further configured to:
  flush an underutilized last level cache (LLC) line in response to determining that a client assigned the LLC line is not using the assigned LLC line effectively;
  assign the newly flushed LLC line to a high DDR BW demand client; and
  send feedback to the high DDR BW demand client to update BW requirements.

7. The computing device of claim 6, wherein the processor is further configured to determine whether further adjustments to the DRAM efficiency value in the computing device.

8. The computing device of claim 7, wherein the processor is further configured to, in response to determining that further adjustments to the DRAM efficiency value in the computing device, perform operations that include:
  determining subsystems of the computing device that may be put into a low-power mode (LPM) based on information stored in a priority table;
  traversing the determined subsystems to identify a low priority subsystem that includes a high DDR BW requirement; and
  causing the identified low priority subsystem to enter the LPM.

9. A method of improving memory bandwidth in a computing device, the method comprising:
  issuing an interrupt signal to a double data rate (DDR) dynamic random-access memory (DRAM) comprising a plurality of last level cache (LLC) lines to determine whether one or more unused LLC lines among the plurality of LLC lines are currently available;
  dynamically assigning the one or more unused LLC lines that are currently available to one or more high DDR bandwidth (BW) demand clients upon receiving one or more new DDR BW requirements from the one or more high DDR BW demand clients; and
  determining a DRAM efficiency value based on a dynamic assignment of the one or more unused LLC lines to the one or more high DDR BW demand clients, wherein the DRAM efficiency value is based at least in part on selectively refreshing, by a partial array self refresh (PASR) component, a first portion of the DRAM that is in active use, and deactivating, by the PASR component, a second portion of the DRAM that is not in active use.

10. The method of claim 9, further comprising using the determined DRAM efficiency value to perform dynamic clock and voltage scaling (DCVS) operations that scale a clock frequency, a DDR frequency, or a supply voltage in the computing device.

11. The method of claim 9, wherein determining whether there are changes in the DDR refresh rate or the DDR density of the DDR DRAM comprises determining whether there are changes in the DDR refresh rate or the DDR density of the DDR DRAM in response to determining that a new DDR BW requirement has not been received.

12. The method of claim 9, further comprising:
  generating a datastore that maps DRAM efficiency as a function of DDR BW, DDR density, and DRAM refresh rate,
  determining the DRAM efficiency value based information included in the generated datastore; and
  determining a DDR frequency value based on the determined DRAM efficiency value.

13. The method of claim 9, wherein determining whether the DDR memory is operating at the upper frequency of operation is performed in response to determining that there are no changes in the DDR refresh rate or the DDR density of the DDR memory.

14. The method of claim 9, further comprising:
  flushing an underutilized last level cache (LLC) line in response to determining that a client assigned the LLC line is not using the assigned LLC line effectively;
  assigning the newly flushed LLC line to a high DDR BW demand client; and
  sending feedback to the high DDR BW demand client to update BW requirements.

15. The method of claim 14, further comprising determining whether further adjustments to the DRAM efficiency value in the computing device.

16. The method of claim 15, further comprising in response to determining that further adjustments to the DRAM efficiency value in the computing device:
  determining subsystems of the computing device that may be put into a low-power mode (LPM) based on information stored in a priority table;
  traversing the determined subsystems to identify a low priority subsystem that includes a high DDR BW requirement; and
  causing the identified low priority subsystem to enter the LPM.

17. A non-transitory computer readable storage medium having stored thereon processor-executable software instructions configured to cause a processor in a computing device to perform operations for improving memory bandwidth in the computing device, the operations comprising:
  issuing an interrupt signal to a double data rate (DDR) dynamic random-access memory (DRAM) comprising a plurality of last level cache (LLC) lines to determine whether one or more unused LLC lines among the plurality of LLC lines are currently available;
  dynamically assigning the one or more unused LLC lines that are currently available to one or more high DDR bandwidth (BW) demand clients upon receiving one or more new DDR BW requirements from the one or more high DDR BW demand clients; and
  determining a DRAM efficiency value based on a dynamic assignment of the one or more unused LLC lines to the one or more high DDR BW demand clients, wherein the DRAM efficiency value is based at least in part on selectively refreshing, by a partial array self refresh (PASR) component, a first portion of the DRAM that is in active use, and deactivating, by the PASR component, a second portion of the DRAM that is not in active use.

18. The non-transitory computer readable storage medium of claim 17, wherein the stored processor-executable software instructions are configured to cause a processor to perform operations further comprising using the determined DRAM efficiency value to perform dynamic clock and voltage scaling (DCVS) operations that scale a clock frequency, a DDR frequency, or a supply voltage in the computing device.

19. The non-transitory computer readable storage medium of claim 17, wherein the stored processor-executable software instructions are configured to cause a processor to perform operations such that determining whether there are changes in the DDR refresh rate or the DDR density of the DDR DRAM comprises determining whether there are changes in the DDR refresh rate or the DDR density of the DDR DRAM in response to determining that a new DDR BW requirement has not been received.

20. The non-transitory computer readable storage medium of claim 17, wherein the stored processor-executable software instructions are configured to cause a processor to perform operations further comprising:

generating a datastore that maps DRAM efficiency as a function of DDR BW, DDR density, and DRAM refresh rate, determining the DRAM efficiency value based information included in the generated datastore; and determining a DDR frequency value based on the determined DRAM efficiency value.

21. The non-transitory computer readable storage medium of claim 17, wherein the stored processor-executable software instructions are configured to cause a processor to perform operations such that determining whether the DDR memory is operating at the upper frequency of operation is performed in response to determining that there are no changes in the DDR refresh rate or the DDR density of the DDR memory.

22. The non-transitory computer readable storage medium of claim 17, wherein the stored processor-executable software instructions are configured to cause a processor to perform operations further comprising:

flushing an underutilized last level cache (LLC) line in response to determining that a client assigned the LLC line is not using the assigned LLC line effectively;

assigning the newly flushed LLC line to a high DDR BW demand client; and sending feedback to the high DDR BW demand client to update BW requirements.

23. The non-transitory computer readable storage medium of claim 22, wherein the stored processor-executable software instructions are configured to cause a processor to perform operations further comprising determining whether further adjustments to the DRAM efficiency value in the computing device.

24. The non-transitory computer readable storage medium of claim 23, wherein the stored processor-executable software instructions are configured to cause a processor to perform operations further comprising in response to determining that further adjustments to the DRAM efficiency value in the computing device:

determining subsystems of the computing device that may be put into a low-power mode (LPM) based on information stored in a priority table;

traversing the determined subsystems to identify a low priority subsystem that includes a high DDR BW requirement; and causing the identified low priority subsystem to enter the LPM.

* * * * *